United States Patent
Czubarow et al.

(10) Patent No.: US 6,901,203 B1
(45) Date of Patent: May 31, 2005

(54) FIBER OPTIC FEED-THROUGH TUBE AND METHOD FOR MAKING THE SAME

(75) Inventors: Pawl Czubarow, Wellsley, MA (US); Raymond L. Dietz, Merrimac, MA (US); Alexander Rogachevsky, Salem, MA (US)

(73) Assignee: Diemat, INC, Byfield, MA (US)

( * ) Notice: Subject to any disclaimer, the term of this patent is extended or adjusted under 35 U.S.C. 154(b) by 187 days.

(21) Appl. No.: 10/290,771

(22) Filed: Nov. 8, 2002

Related U.S. Application Data

(60) Provisional application No. 60/337,403, filed on Nov. 9, 2001.

(51) Int. Cl.[7] .................................................. G02B 6/10
(52) U.S. Cl. ......................... 385/138; 385/94; 385/139
(58) Field of Search .................................. 385/138–139, 385/94, 147

(56) References Cited

U.S. PATENT DOCUMENTS

| | | | |
|---|---|---|---|
| 4,695,125 A | 9/1987 | Sinclair et al. ................ 385/94 |
| 4,994,134 A | 2/1991 | Knecht et al. ................ 156/294 |
| 5,143,531 A | 9/1992 | Kramer | |
| 5,337,387 A | 8/1994 | Kramer ......................... 385/76 |
| 5,475,784 A | 12/1995 | Bookbinder et al. ........... 385/94 |
| 5,568,585 A | 10/1996 | Kramer ....................... 385/139 |
| 5,613,031 A | 3/1997 | Tanabe et al. ............... 385/138 |
| 5,658,364 A | 8/1997 | DeVore et al. ................. 65/431 |
| 5,692,086 A * | 11/1997 | Beranek et al. ............... 385/94 |
| 6,145,731 A | 11/2000 | Tower et al. ............. 228/122.1 |

* cited by examiner

Primary Examiner—Phan T. H. Palmer
(74) Attorney, Agent, or Firm—Huntley & Associates LLC

(57) ABSTRACT

A fiber optic feed-through tube, a method for making it and a method for hermetically sealing and aligning lightwave waveguides inserted into the tube. The feed-through tube is preferably a metal tube with low melting point hermetic sealing material deposited on one end and the lightwave waveguide is an optical glass fiber. The fiber is fed through a tube having low melting point hermetic sealing material on one end.

22 Claims, 1 Drawing Sheet

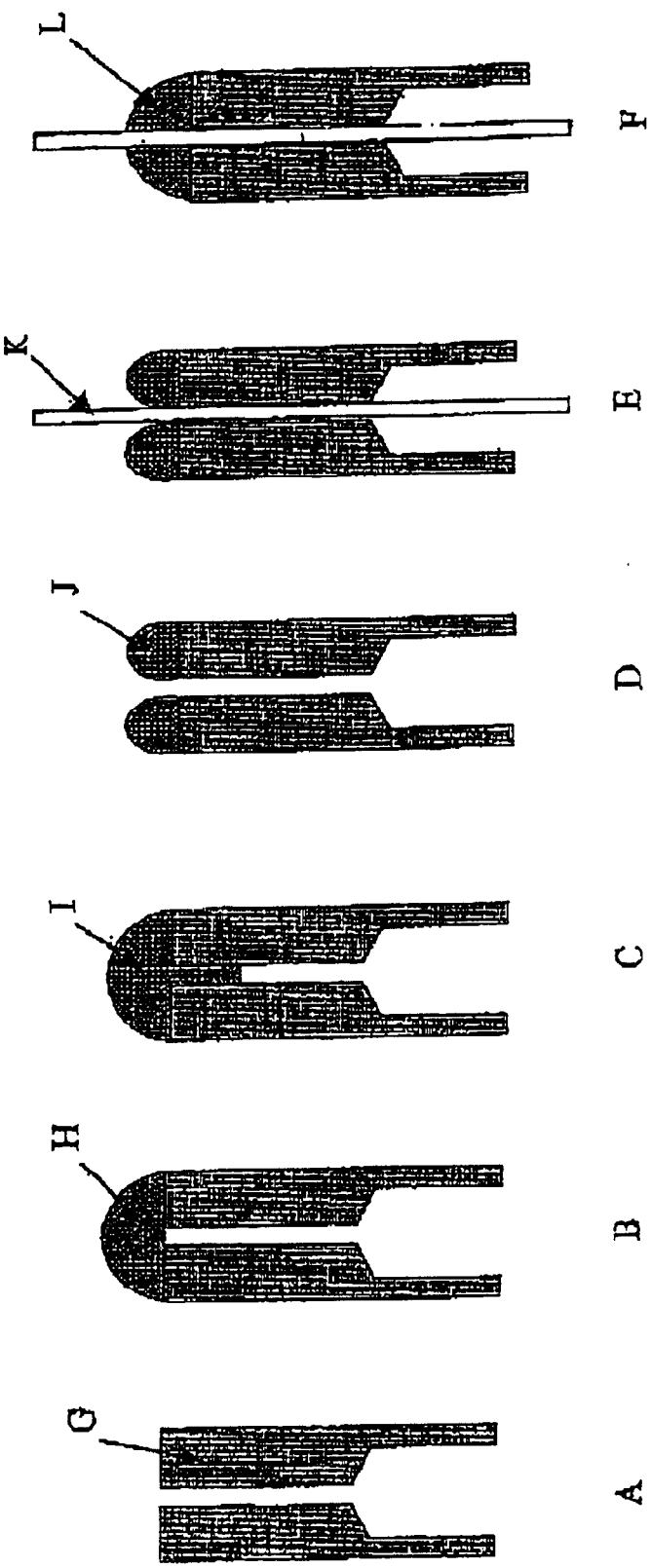

FIBER OPTIC FEED-THROUGH TUBE AND METHOD FOR MAKING THE SAME

CROSS-REFERENCE TO RELATED APPLICATION

This application is based on Provisional Application Ser. No. 60/337,403, filed Nov. 9, 2001.

BACKGROUND OF THE INVENTION

Many electronic packages require hermetically sealed connections from the inside of the package to the outside, such as electrical pins hermetically sealed through a hole in the package wall. The fiber optic industry, in particular, requires optical fibers passing through the package wall to the outside. Historically, the fibers were soldered into a feed-through tube which was in turn soldered to an opening in the wall, creating a hermetic feed-through of the optical fiber.

The soldering operation for a fiber optic assembly is relatively expensive, requiring metallization of the optical fiber for solder wetting. More recently, tiny glass preforms were substituted for the solder in the end of the feed-through tube. This eliminated the requirement for metallization and the associated atmosphere and cleaning requirements of soldering, thereby reducing the manufacturing costs of a fiber optic assembly significantly. The glass preforms are made by mixing glass powder with a binder which gave the preform green strength after pressing. After pressing, the preforms are fused to give green strength for shipping and handling. The preforms, shaped like tiny donuts with an inside diameter as small as 0.010", are then loaded by hand over the optical fibers and rested on the end of the feed-through tube. The resulting assembly of tube, fiber, and preform is then heated to flow the glass and seal the fiber into the tube.

Although the glass preforms were a major improvement over solder, they also had some disadvantages. The tiny preforms are relatively expensive to manufacture with consistently high quality. Sometimes minor fluctuations in the glass preform manufacturing process caused significant yield loss in a fiber optic assembly line. Once manufactured, preforms have to be stored in moisture free atmosphere. Failure of placing them in dry atmosphere would cause them to hydrolyze and become fragile. A more significant drawback was that there was no easy way to automate the loading of the tiny preforms over the optical fibers fed through the feed-through tube. In this case, the feed-through tube was a tiny cylindrical gold plated Kovar metal alloy tube with a less than 10 mil hole bored through the length. The loading of the glass preforms manually was the bottleneck in the production line.

A variety of techniques have been suggested in the past for dealing with similar problems.

Sinclair et al., in U.S. Pat. No. 4,695,125, teach a passive fiber optic device and optical fiber connected to it that are packaged in a solid block of a bismuth-containing fusible alloy. The alloy exhibits appreciable expansion on solidification, negligible dimensional change after solidification, and a low thermal expansion coefficient. Coupled with its low melting point and glass wetting ability, the alloy is uniquely adapted for forming a hermetic seal with glass. By molding as a solid block, the packaging operation is rendered simple and rapid.

Knecht et al., in U.S. Pat. No. 4,994,134, disclose a method of making a two-layered (ceramic-glass) ferrule having a high degree of concentricity employing the steps of: (a) providing a tubular fixture; (b) inserting a ferrule fixture into a portion of the tubular fixture, the ferrule fixture having continuous and non-continuous channels, the concentricity of the continuous channel varying no more than two microns; (c) inserting a ceramic ferrule tubular member into the tubular fixture; (d) inserting a glass ferrule tubular member into the ceramic ferrule tubular member and into the non-continuous channel of the ferrule fixture; (e) inserting an alignment member, having a length greater than the glass ferrule tubular member and a diameter that matches the internal diameter of the glass ferrule tubular member and the continuous channel of said ferrule fixture within one micron, into the continuous channel of the ferrule fixture and into the glass ferrule tubular member, (f) bonding the ceramic ferrule tubular member to the glass ferrule tubular member to form a composite; and (g) removing the alignment member and glass-ceramic composite from the tubular fixture.

Kramer, in U.S. Pat. No. 5,143,531, teaches a glass-to-glass hermetic sealing technique which can be used to splice lengths of glass fibers together. A solid glass preform is inserted into the cavity of a metal component which is then heated to melt the glass. An end of an optical fiber is then advanced into the molten glass and the entire structure cooled to solidify the glass in sealing engagement with the optical fiber end and the metal cavity.

Kramer, in U.S. Pat. No. 5,337,387, teaches hermetic fiber optic-to-metal components and a method for making hermetic fiber optic-to-metal components by assembling and fixturing elements comprising a metal shell, a glass preform, and a metal-coated fiber optic into desired relative positions and then sealing said fixtured elements preferably using a continuous heating process. The resultant hermetic fiber optic-to-metal components exhibit high hermeticity and durability despite the large differences in thermal coefficients of expansion among the various elements.

Bookbinder et al., in U.S. Pat. No. 5,475,784, teach a method of encapsulating an optical component, the component comprising at least partially uncoated organic material, the method comprising placing molten metal around the optical component and solidifying the metal. The invention includes encapsulating a segment or element of an optical component, such as an optical junction or a surface. An encapsulated optical component and optical components having sealed or encapsulated elements are also provided.

Kramer, in U.S. Pat. No. 5,568,585, teaches a method for manufacturing low-temperature hermetically sealed optical fiber components. The method comprises the steps of: inserting an optical fiber into a housing, the optical fiber having a glass core, a glass cladding and a protective buffer layer disposed around the core and cladding; heating the housing to a predetermined temperature, the predetermined temperature being below a melting point for the protective buffer layer and above a melting point of a solder, placing the solder in communication with the heated housing to allow the solder to form an eutectic and thereby fill a gap between the interior of the housing and the optical fiber, and cooling the housing to allow the solder to form a hermetic compression seal between the housing and the optical fiber.

Tanabe et al., in U.S. Pat. No. 5,613,031, to teach a package member which has fitted in a through hole thereof a pipe member with an optical fiber inserted therein, the optical fiber including a jacketed part thereof fitted in and soldered to an inside region of the pipe member, with a solder filled there between, and a stripped part thereof fitted in and fixed to another inside region of the pipe member, with an adhesive filled there between, while the pipe member is fixed to the package member by a welding along a circumference of the through hole, without using a fixing ring, permitting a relatively high hermeticity to be achieved in a facilitated fabrication process.

DeVore et al., in U.S. Pat. No. 5,658,364, teach a method of making fiber optic-to-metal connection seals. The optical fiber and a preform made of a sealing material are inserted into a metal cup. The metal is then heated to a temperature which melts the sealing material to form a hermetic seal between the cup and the fiber optic. The hermetic sealing material is selected from glass, glass-ceramic or braze and the metal is selected from stainless steel, a metal alloy or a high-strength superalloy.

Beranek et al., in U.S. Pat. No. 5,692,086, teach an optoelectronic package which includes an optical fiber cable assembly and feed-through assembly which provide high performance and high reliability optical fiber alignment, locking and sealing. An optical fiber is fed through a nose tube into the package. The fiber is selectively metallized at its end. A solder lock joint on a substrate on the package floor preferably of a SnAg-based or SnSb-based solder. It surrounds at least part of the metallized portion of the fiber so as to hold the fiber in its desired position, in alignment with an optoelectronic device in the package. With Sn metallization on the fiber, this results in a highly reliable solder lock joint. A solder seal joint forms a hermetic seal between the nose tube and the Au metallized fiber. This solder is preferably 80Au/20Sn. A rigid cylindrical seal tube sleeve insert on the, fiber is designed to guide the fiber into the nose tube without bending or damaging the fiber.

Tower, et al., in U.S. Pat. No. 6,145,731, teach a method of making hermetic seals between optically transparent ceramic or glass member and a metallic housing. The member is then press-fit into the aperture, partially displacing metal from the walls of the aperture, forming an inner burr circumscribing the aperture. The walls of the aperture and the circumscribing burr are then coated with a second metal, preferably electroless nickel.

SUMMARY OF THE INVENTION

The present invention provides a fiber optic feed-through tube and a process which eliminates the glass preform by depositing the low melting point hermetic sealing material directly on the end of the feed-through tube.

Specifically, the present invention provides a fiber optic feed-through tube having a low melting point hermetic sealing material chemically bonded to one end of the tube. The invention also provides a process for applying a low melting point hermetic sealing material to the end of a feed-through tube in a hermetic package comprising:

a) providing a tube having an outside diameter and a throughbore;

b) placing low melting point hermetic sealing material on one end of the tube;

c) heating the tube to at least the sintering temperature of the low melting point hermetic sealing material;

d) injecting gas under pressure to form an aperture in the low melting point hermetic sealing material at the point of the throughbore; and e) cooling the fiber optic hybrid feed-through tube to ambient temperature with continuous injection of gas under pressure.

BRIEF DESCRIPTION OF THE FIGURE

The FIGURE is a schematic diagram of the present invention, showing various stages of preparation of a representative feed-through tube. There, A is a cross-sectional illustration of a feed-through tube, G. B shows the application of low melting point hermetic sealing material, H. C shows the feed-through tube with low melting point hermetic sealing material I molten into the feed-through tube. D shows the feed-through tube, with low melting point hermetic sealing material J after the introduction of a compressed air jet. E shows the feed-through tube with low melting point hermetic sealing material J and a fiber optic filament K. F shows the feed-through tube, G with low melting point hermetic sealing material hermetically sealing the fiber optic filament.

DETAILED DESCRIPTION OF THE INVENTION

In accordance with the present invention, a feed-through tube is provided onto which low melting point hermetic sealing material is chemically bonded.

The feed-through tube can be made of a wide variety of materials, such as metal, ceramic, and glass. Metal is preferred.

The low melting sealing material typically has a melting point of about from 300 to 450° C., preferably about from 320 to 400° C., and especially about from 320 to 350° C. The sealing material can be selected, for example, from glass, lead-free glass, glass/ceramic blends, lead-free glass/ceramic, metallic solder, and lead-free metallic solder. Within these parameters, a wide variety of known glasses can be used. Preferred are low temperature sealing glasses, that is, those amorphous materials having a glass transition temperature ($T_g$) of about 200–300° C. Representative are those materials described in Dietz, U.S. Pat. No. 4,933,030, which is hereby incorporated by reference.

The low melting point hermetic sealing material is deposited onto the ends of the tubes in a form of a solid mass, dry powder, slurried powder, or paste. The solid tube is then heated by any convenient means, such as radiant, infrared, radio frequency, or microwave radiation to a point at which the low melting point hermetic sealing material is sintered or melted. During the heating, a jet of compressed gas, preferably air, is introduced to create the opening in the low melting point hermetic sealing material. The gas can be supplied by any convenient means, for example, compressed air, at a pressure sufficient to blow through the surface tension of the molten glass to form an aperature cocentric with the feed-through tube. Standard compressed air at a pressure of about 30–100 psi, for example, can be used.

The hermetic sealing material, after heating to the sintering or melting point, is preferably chemically bonded to the feed-through tube. Chemical bonding is used in its usual sense, that is, to mean that the bond between the sealing material and the tube is on the molecular level, such as that obtained by covalent, ionic, hydrogen, dative, coordinate, non-polar and polar bonds. Chemical bonds are especially preferred which result in the bonded components fracturing, on testing, away from the adhesive bond line.

The glass can be applied to the feed-through tubes in the form of a slurry, which typically comprises glass powder, a thermal expansion coefficient modifier such as $Nb_2O_5$, and organic solvent. The amount of organic solvent used should be sufficient to achieve a viscosity of about from 1 to 40 kcps.

The present invention is applicable for use with a wide variety of optical fibers, including, for example, those prepared from glass and acrylic polymers. After insertion into the tubes, a hermetic seal is achieved when the sealing material melts between the feed-through and the exposed region of the optical fiber. A bond is formed between the feed-through and the optical fiber during cooling of the molten sealing material. Apart from sealing, the fiber optic hybrid feed-through tube provides high reliability and concentric optical fiber alignment. The resultant seal remains hermetic following thermal cycling and is particularly suited for the manufacture of a hybrid electronic package having an optical or opto-electronic coupling.

The present invention is further illustrated by the following Examples and Comparative Example, which are provided only for purposes of illustration, and should not be construed as limiting the invention.

EXAMPLE 1

Slurry Application

A low melting point hermetic sealing material was prepared by blending 10.0 g of glass powder with 0.7 g of $Nb_2O_5$, a thermal expansion coefficient modifier. The mixture was then blended with 1.5 g of organic solvent to achieve a slurry with a viscosity between 10–40 kcps. The slurry was then charged into a micropipette dispenser. An amount of 0.0020 g of slurry was then dispensed onto a plurality of metal feed-through tubes which were aligned in a metal jig in an upright position. The jig with the feed-through tubes was then placed in a furnace and heated to 200° C. where it was held for 30 minutes. The jig was then removed from the furnace and brought to room temperature. The feed-through tubes were then heated by a radio frequency above the melting point of the glass. The feed-through tubes were then reheated while simultaneously applying a jet of air to the fixture, to form openings in the molten glass. Tubes were then cooled with the jet of air. An optic fiber was then fed through each tube and the whole package was heated by radio frequency until the glass on the end of the tube had re-melted and hermetically sealed each fiber.

EXAMPLE 2

Sintered Mass

A plurality of upright standing metal feed-through tubes were charged with 0.0013 g of sintered glass mass. Tubes were then heated by a radio frequency until the sintered glass mass on the end of the tubes had melted. The tubes were then heated again while simultaneously applying a jet of air that was directed through the feed-through tube. Tubes were then cooled down with the jet of air on. A fiber optic fiber was then fed through the tube and the whole package was heated by a radio frequency until the glass on the end of the tube had re-melted and hermetically sealed the fiber.

COMPARATIVE EXAMPLE

Conventional Preform

Metal feed-through tubes were aligned in a metal fixture in an upright position. Optical fibers were then fed through the tubes. A sintered glass preform (OD: 1.05, ID: 0.38 mm, Thickness: 0.25 mm) was threaded through the fiber and was rested on top of each tube. The tubes were then heated by a radio frequency until the preforms on the end of the tubes had melted and hermetically sealed the fiber.

We claim:

1. A fiber optic feed-through tube comprising:
   a) a tube having an outside diameter and a throughbore and
   b) a low melting point hermetic sealing material chemically bonded to one end of the tube, the sealing material having a through opening co-centric with the throughbore.

2. A fiber optic feed-through tube of claim 1 wherein the low melting point hermetic sealing material is selected from the group consisting of glass, lead-free glass, glass/ceramic, lead-free glass/ceramic, metallic solder, and lead-free metallic solder.

3. A fiber optic feed-through tube of claim 2 wherein the hermetic sealing material consists essentially of glass.

4. A fiber optic feed-through tube of claim 2 wherein the hermetic sealing material consists essentially of lead-free glass.

5. A fiber optic feed-through tube of claim 2 wherein the hermetic sealing material consists essentially of glass/ceramic.

6. A fiber optic feed-through tube of claim 2 wherein the hermetic sealing material consists essentially of lead-free glass ceramic.

7. A fiber optic feed-through tube of claim 2 wherein the hermetic sealing material consists essentially of metallic solder.

8. A fiber optic feed-through tube of claim 2 wherein the hermetic sealing material consists essentially of lead-free metallic solder.

9. A fiber optic feed-through tube of claim 1 wherein the tube is formed of a material selected from the group consisting of metal, ceramic, metal/ceramic, and glass.

10. A fiber optic feed-through tube of claim 1 wherein the low melting point hermetic sealing material has a melting temperature of about from 300 to 450° C.

11. A fiber optic feed-through tube of claim 1 wherein the low melting point hermetic sealing material has a melting temperature of about from 320 to 400° C.

12. A fiber optic feed-through tube of claim 1 wherein the low melting point hermetic sealing material has a melting temperature of about from 320 to 350° C.

13. A method of forming fiber optic feed-through tube of claim 1, comprising the steps of:
   (a) providing a tube having an outside diameter and a throughbore;
   (b) placing low melting point hermetic sealing material on one end of said tube;
   (c) heating said tube with said low melting point hermetic sealing material to at least the temperature of sintering of said low melting point hermetic sealing material;
   (d) injecting gas under pressure to form said throughbore of said low melting point hermetic sealing material; and
   (e) cooling the fiber optic hybrid feed-through tube to ambient temperature with continuous injection of gas under pressure.

14. A method of claim 13 wherein the heating is by radiant, infrared, radio frequency, or microwave radiation.

15. A method of claim 13 wherein the tube is formed from a group consisting of metal, ceramic, metal/ceramic, and glass.

16. A method of claim 13 wherein the heating step comprises heating the fiber optic feed-through tube to a temperature of about from 300 to 450° C.

17. A method of claim 13 wherein the bond between said low melting point hermetic sealing material and said tube is chemical.

18. A method of claim 13 wherein said low melting point hermetic sealing material is selected from the group consisting of glass, lead-free glass, glass/ceramic, lead-free glass/ceramic, metallic solder, and lead-free metallic solder.

19. A method of claim 13 wherein the heating step further comprises the step of heating the tube, thereby facilitating the position on the center of the throughbore of the molten low melting point hermetic sealing material.

20. A method of claim 13 wherein the gas injection step further comprises the step of gas injection through the tube, thereby facilitating formation of the throughbore in low melting point hermetic sealing material and the co-centric position of said throughbore in relation to the throughbore of said tube.

21. An article obtained by the method of claim 13.

22. A method of hermetically sealing optical fiber in a fiber optic feed-through tube having hermetic sealing material on one end, comprising the steps of:

a) inserting an optical fiber through the fiber optic feed-through tube;

b) heating the fiber optic feed-through tube to the melting or flow point of the hermetic sealing material; and c) forming a hermetic seal between the tube and the optical fiber including the molten hermetic sealing material substantially therebetween, and cooling of the molten low melting point hermetic sealing material.

* * * * *